(12) United States Patent
Shinozaki et al.

(10) Patent No.: US 10,012,152 B2
(45) Date of Patent: Jul. 3, 2018

(54) CONTROL DEVICE AND CONTROL METHOD FOR INTERNAL COMBUSTION ENGINE

(71) Applicant: Hitachi Automotive Systems, Ltd., Hitachinaka-shi, Ibaraki (JP)

(72) Inventors: Yuya Shinozaki, Isesaki (JP); Naoki Okamoto, Isesaki (JP); Akira Kiyomura, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/126,783

(22) PCT Filed: Sep. 18, 2014

(86) PCT No.: PCT/JP2014/074706
§ 371 (c)(1),
(2) Date: Sep. 16, 2016

(87) PCT Pub. No.: WO2015/141037
PCT Pub. Date: Sep. 24, 2015

(65) Prior Publication Data
US 2017/0096949 A1    Apr. 6, 2017

(30) Foreign Application Priority Data

Mar. 20, 2014 (JP) ................. 2014-058324

(51) Int. Cl.
*F02D 15/02* (2006.01)
*F02B 75/04* (2006.01)
(Continued)

(52) U.S. Cl.
CPC ............ *F02D 15/02* (2013.01); *F02B 75/045* (2013.01); *F02D 13/02* (2013.01); *F02D 41/221* (2013.01);
(Continued)

(58) Field of Classification Search
CPC .......... F02D 13/00; F02D 13/02; F02D 13/04; F02D 41/22; F02D 41/221;
(Continued)

(56) References Cited

U.S. PATENT DOCUMENTS 4,834,031 A * 5/1989 Katoh ................. F02B 75/04
123/48 R
6,745,619 B2 * 6/2004 Cullen ................ F02B 75/04
73/114.16
(Continued)

FOREIGN PATENT DOCUMENTS

JP    01125528 A  *  5/1989
JP    7-72515 B2      8/1995
(Continued)

OTHER PUBLICATIONS

Japanese-language International Preliminary Report on Patentability (PCT/IPEA/409) issued in PCT Application No. PCT/JP2014/074706 dated Jan. 29, 2016 with English translation (Eight (8) pages).

(Continued)

*Primary Examiner* — Mahmoud Gimie
*Assistant Examiner* — John Zaleskas
(74) *Attorney, Agent, or Firm* — Crowell & Moring LLP (57) ABSTRACT

A control device for an internal combustion engine including a variable compression ratio mechanism for changing a compression ratio by using an electric actuator prohibits control of changing the compression ratio to a higher compression ratio when a failure occurs in the variable compression ratio mechanism. Thereby, upon failure occurrence, the compression ratio of the variable compression ratio mechanism at the time of the failure occurrence is (Continued)

maintained or reduced to less than this compression ratio so as to protect the electric actuator and prevent abrupt changes in torque.

10 Claims, 5 Drawing Sheets

(51) Int. Cl.
    *F02D 13/02*     (2006.01)
    *F02D 41/22*     (2006.01)
    *F02P 5/145*     (2006.01)
(52) U.S. Cl.
    CPC ........ *F02P 5/145* (2013.01); *F02D 2041/227* (2013.01)
(58) Field of Classification Search
    CPC ......... F02D 2041/001; F02D 2041/227; F02B 75/04; F02B 75/041; F02B 75/045; F02B 75/048
    USPC ............. 123/48 A, 48 AA, 48 B, 48 C, 48 R
    See application file for complete search history.

(56) References Cited

U.S. PATENT DOCUMENTS

| | | | | |
|---|---|---|---|---|
| 2003/0084875 | A1* | 5/2003 | Cullen | F02D 15/02 123/406.23 |
| 2004/0194737 | A1* | 10/2004 | Miyashita | F02D 15/00 123/48 C |
| 2007/0225892 | A1* | 9/2007 | Yasui | F02B 75/048 701/104 |
| 2008/0133113 | A1* | 6/2008 | Yasui | F01L 13/0063 701/105 |
| 2009/0125208 | A1* | 5/2009 | Yasui | F02B 75/048 701/103 |
| 2010/0250091 | A1* | 9/2010 | Kawasaki | H02P 7/29 701/102 |
| 2011/0253108 | A1* | 10/2011 | Kawasaki | F02D 13/02 123/48 R |
| 2012/0279476 | A1* | 11/2012 | Kawasaki | F02D 13/0223 123/48 R |
| 2013/0055989 | A1* | 3/2013 | Kawasaki | F02D 15/04 123/48 C |
| 2013/0333670 | A1* | 12/2013 | Wodischek | F02B 75/048 123/48 B |
| 2014/0026861 | A1* | 1/2014 | Bechtold | F02B 75/045 123/48 R |
| 2015/0354488 | A1* | 12/2015 | Hiyoshi | F02D 41/123 123/48 B |
| 2016/0252022 | A1* | 9/2016 | Shinozaki | F02D 15/02 123/48 B |
| 2016/0319736 | A1* | 11/2016 | Okawa | F02F 1/18 |
| 2016/0348595 | A1* | 12/2016 | Kiyomura | F02D 15/02 |

FOREIGN PATENT DOCUMENTS

| | | | | |
|---|---|---|---|---|
| JP | 2004308618 A | * | 11/2004 | ........ F02D 13/0207 |
| JP | 2005069204 A | * | 3/2005 | |
| JP | 2005-113884 A | | 4/2005 | |
| JP | 2006-105031 A | | 4/2006 | |
| JP | 2006-161583 A | | 6/2006 | |
| JP | 2007056835 A | * | 3/2007 | |
| JP | 2007-247536 A | | 9/2007 | |
| JP | 2007224927 A | * | 9/2007 | |
| JP | 2007247536 A | * | 9/2007 | |
| JP | 2009-185629 A | | 8/2009 | |
| JP | 2010-255460 A | | 11/2010 | |
| JP | 2012225331 A | * | 11/2012 | |
| WO | WO 2012013263 A1 | * | 2/2012 | ............ F02B 75/048 |

OTHER PUBLICATIONS

International Preliminary Report on Patentability (PCT/IPEA/409) and English translation of previously submitted document C3 (Japanese-language International Preliminary Report on Patentability (PCT/IPEA/409) filed on Sep. 19, 2016) (Six (6) pages).
German Office Action issued in counterpart German Application No. 11 2014 006 487.4 dated Apr. 18, 2017 with partial English translation (10 pages).
Japanese-language Office Action issued in counterpart Japanese Application No. 2014-058324 dated Jun. 6, 2017 with English translation (Five (5) pages).
International Search Report (PCT/ISA/210) issued in PCT Application No. PCT/JP2014/074706 dated Oct. 28, 2014 with English translation (Four (4) pages).
Japanese-language Written Opinion (PCT/ISA/237) issued in PCT Application No. PCT/JP2014/074706 dated Oct. 28, 2014 (Five (5) pages).

* cited by examiner

CONTROL DEVICE AND CONTROL METHOD FOR INTERNAL COMBUSTION ENGINE

TECHNICAL FIELD

The present invention relates to a control device and a control method which change the compression ratio of an internal combustion engine.

BACKGROUND ART

As described in Patent Document 1, there has been disclosed a variable compression ratio mechanism which changes the compression ratio of an internal combustion engine to a minimum upon the stop of an electric actuator, such as a motor, of the variable compression ratio mechanism.

REFERENCE DOCUMENT LIST

Patent Document

Patent Document 1: JP 2005-113884 A

SUMMARY OF THE INVENTION

Problems to be Solved by the Invention

In such a variable compression ratio mechanism, when the electric actuator is stopped to protect the electric actuator upon, for example, occurrence of a failure therein, the compression ratio is changed to a minimum against the driver's will, resulting in abrupt changes in torque.

To address this risk, an object of the present invention is to provide a control device and a control method for an internal combustion engine which are capable of protecting an electric actuator while preventing abrupt torque changes.

Means for Solving the Problems

In view of the above, in a control device for an internal combustion engine according to the present invention, which includes a variable compression ratio mechanism for changing a compression ratio by using an electric actuator, when a failure occurs in the variable compression ratio mechanism, the control device prohibits control of changing the compression ratio to a higher compression ratio, and the control device stops current supply to the electric actuator when a drive current for the electric actuator is not reduced by a predetermined value after the control of changing the compression ratio to a higher compression ratio is prohibited.

In a control method for an internal combustion engine according to the present invention, a control device which controls a variable compression ratio mechanism for changing a compression ratio of the internal combustion engine by using an electric actuator prohibits control of changing the compression ratio to a higher compression ratio when a failure occurs in the variable compression ratio mechanism, and the control device stops current supply to the electric actuator when a drive current for the electric actuator is not reduced by a predetermined value after the control of changing the compression ratio to a higher compression ratio is prohibited.

Effects of the Invention

The present invention makes it possible to protect the electric actuator and prevent abrupt torque changes.

MODE FOR CARRYING OUT THE INVENTION

Hereinafter, an embodiment for carrying out the present invention will be described in detail with reference to the attached drawings.

Figure 1:
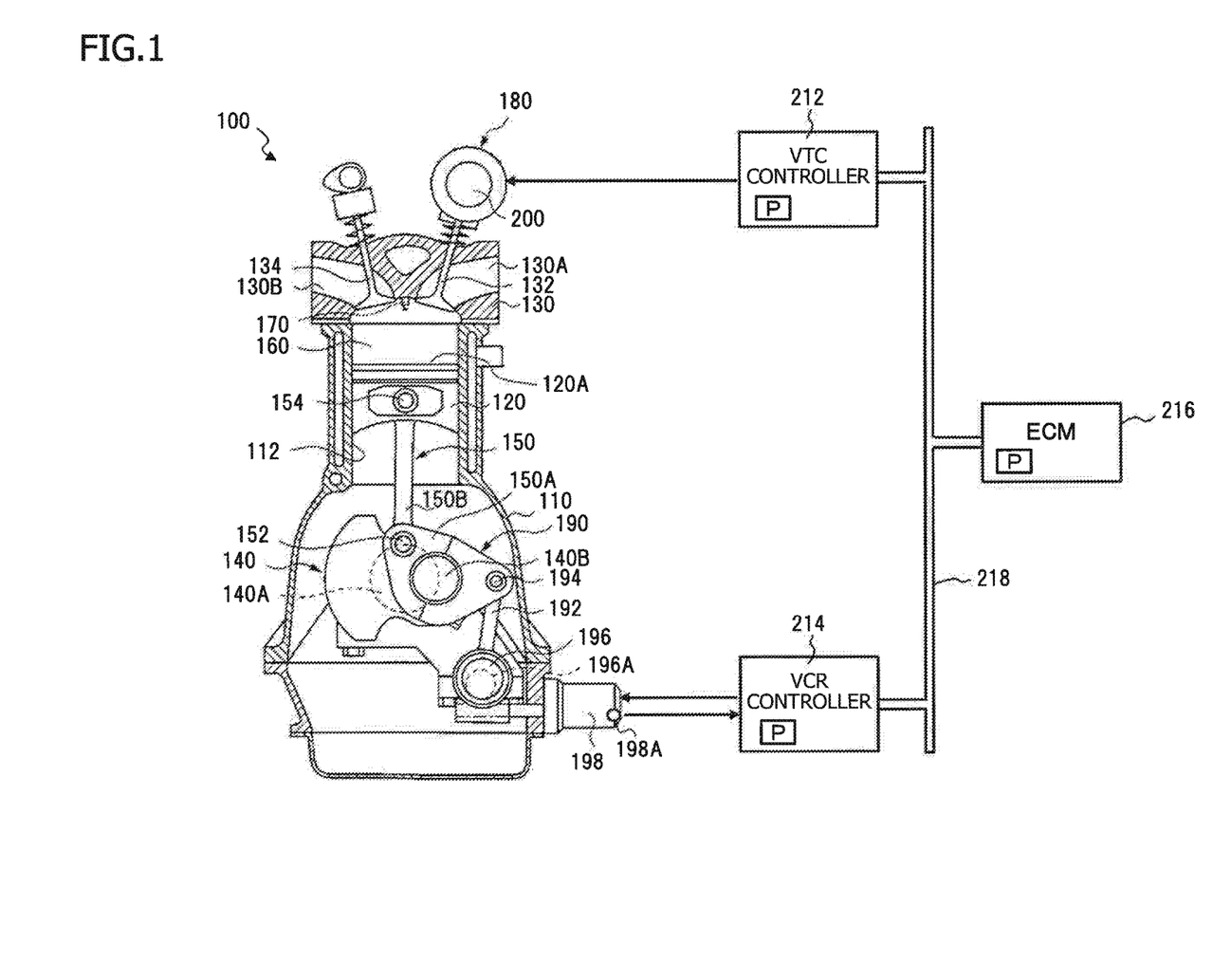
FIG. 1 is a system diagram of an internal combustion engine according to an embodiment.

In FIG. 1, an internal combustion engine 100 has a cylinder block 110, pistons 120, a cylinder head 130, intake valves 132 and exhaust gas valves 134. Pistons 120 are reciprocatably inserted and fitted in cylinder bores 112 of cylinder block 110. In cylinder head 130, intake ports 130A and exhaust ports 130B are formed. Each Intake valve 132 opens and closes an opening end of the corresponding intake port 130A while each exhaust gas valve 134 opens and closes an opening end of the corresponding exhaust port 130B.

Pistons 120 are connected to a crank shaft 140 by way of conn-rods (connecting rods) 150 each of which includes a lower link 150A and an upper link 150B. Combustion chambers 160 are defined between a lower surface of cylinder head 130 and crown surfaces 120A of pistons 120. Spark plugs 170 for igniting air-fuel mixture are mounted on cylinder head 130 so that each spark plug 170 is located at substantially the center of one of combustion chambers 160.

Upon being supplied with a high voltage from an unillustrated ignition coil, each spark plug 170 generates a spark discharge to ignite the air-fuel mixture. The ignition timing is controlled through the control of supply timing of the high voltage from the ignition coil.

In addition, internal combustion engine 100 includes a variable valve timing (valve timing control: VTC) mechanism 180 and a variable compression ratio (VCR) mechanism 190. VTC mechanism 180 makes the phase of the opening timing of intake valve 132 variable relative to crank shaft 140, in other words, makes valve timing variable. VCR mechanism 190 makes a compression ratio variable by changing the position of the top dead center of each piston 120.

VTC mechanism 180, which is an example of a variable valve mechanism, continuously advances or retards the center phase of an operation angle of intake valve 132 while holding the operation angle constant, by changing a phase of an intake cam shaft 200 relative to crank shaft 140.

For example, an electric VTC mechanism may be used as VTC mechanism 180. As disclosed in JP 2013-036391 A, the electric VTC mechanism uses an electric motor to adjust the rotational phase angle of intake cam shaft 200 relative to crank shaft 140.

Note, however, that VTC mechanism 180 does not have to use a motor as an actuator, and other arrangements are possible. For example, a known mechanism using a hydraulic actuator or the like may be appropriately employed as VTC mechanism 180.

VCR mechanism 190 makes the compression ratio of internal combustion engine 100 variable by using, for example, a mechanism as disclosed in JP 2002-276446 A to change the position of the top dead center of each piston 120. Hereinafter, an example of VCR mechanism 190 will be described.

Crank shaft 140 has multiple journal portions 140A and crank pin portions 140B, and journal portions 140A are rotatably supported by main bearings (not illustrated) of cylinder block 110. Crank pin portions 140B are eccentric with respect to journal portions 140A, and lower links 150A are rotatably connected to crank pin portions 140B. In each conn-rod 150A, a lower end of upper link 150B is rotatably connected to one end of lower link 150A by way of a connection pin 152, and an upper end of upper link 150B is rotatably connected to piston 120 by way of a piston pin 154. Upper ends of control links 192 are rotatably connected to the other ends of lower links 150A by way of connection pins 194, and lower ends of control links 192 are rotatably connected to a lower portion of cylinder block 110 by way of a control shaft 196. Specifically, control shaft 196 is rotatably supported by the engine main body (cylinder block 110), and has eccentric cam portions 196A, whose centers of rotation are off center. The lower ends of control links 192 are rotatably fitted to eccentric cam portions 196A. The rotational position of control shaft 196 is controlled by a compression ratio control actuator (hereinafter referred to as electric actuator) 198 using a motor.

In VCR mechanism 190 using such a multi-link piston-crank mechanism as described above, the center position, i.e., the position relative to the engine main body (cylinder block 110), of each eccentric cam portion 196A changes as control shaft 196 is rotated by electric actuator 198.

This changes the swing support position at the lower end of each control link 192. Thereby, the stroke of each piston 120 is changed to raise or lower the top dead center position of piston 120, and thus the compression ratio of internal combustion engine 100 is changed. In other words, in accordance with the angular position of control shaft 196, the top dead center position of piston 120 changes, and thus the compression ratio of internal combustion engine 100 changes.

Here, electric actuator 198 increases the compression ratio by increasing a drive current for the motor, and reduces the compression ratio by reducing the drive current for the motor. In other words, the higher the compression ratio, the higher the load on electric actuator 198, and the lower the compression ratio, the lower the load on electric actuator 198. Electric actuator 198 can maintain the compression ratio constant by setting the magnitude of the drive current to a value according to an actual compression ratio.

When the operation of electric actuator 198 stops, the reciprocating movement of pistons 120 rotates control link 192 with respect to eccentric cam portion 196A of control shaft 196, and changes the compression ratio to a lower compression ratio. In other words, the activation of internal combustion engine 100 changes the compression ratio to a lower compression ratio.

In internal combustion engine 100 described above, an unillustrated ignition coil, an unillustrated fuel injection valve and the like are controlled by an engine control module (ECM) 216, VCR mechanism 190 is controlled by a VCR controller 214, and VTC mechanism 180 is controlled by a VTC controller 212.

ECM 216, VCR controller 214 and VTC controller 212, each of which includes a processor P such as a microcomputer, are communicatively connected to each other through a controller area network (CAN) 218, which is an example of an in-vehicle network. Accordingly, VTC controller 212, VCR controller 214 and ECM 216 are capable of transmitting and receiving any data to/from each other through CAN 218. Note that the in-vehicle network is not limited to CAN 218, but may be any of various networks such as FlexRay (registered trademark).

ECM 216 calculates a target compression ratio of VCR mechanism 190 and a target phase angle of VTC mechanism 180 on the basis of operating conditions of internal combustion engine 100. ECM 216 transmits the target compression ratio to VCR controller 214, and transmits the target phase angle to VTC controller 212. ECM 216 can include a timer for measuring time.

VCR controller 214 receives the target compression ratio transmitted by ECM 216, and an output signal of an angle sensor 198A, which detects the actual compression ratio by detecting the angular position of control shaft 196.

VCR controller 214 controls the drive current to be outputted to electric actuator 198 of VCR mechanism 190 so as to settle the angular position of control shaft 196 detected by angle sensor 198A into a target angular position corresponding to the target compression ratio.

Here, VCR controller 214 can include a timer for measuring time.

VTC controller 212 receives the target phase angle transmitted by ECM 216, as well as an output signal from a crank angle sensor (not illustrated) for detecting an angular position of crank shaft 140 and an output signal from a cam angle sensor (not illustrated) for detecting an angular position of intake cam shaft 200.

From the output signals from the crank angle sensor and the cam angle sensor, VTC controller 212 detects the rotational phase angle of intake cam shaft 200 relative to crank shaft 140. VTC controller 212 controls the drive current to be outputted to the actuator of VTC mechanism 180 so as to settle the detected relative rotational phase angle into the target phase angle.

The above configuration allows VTC mechanism 180 and VCR mechanism 190 to be controlled in accordance with operating conditions of internal combustion engine 100.

When a failure occurs in VCR mechanism 190, VCR mechanism 190 might be unable to be properly controlled. Conceivable examples of such a failure that makes the proper control impossible include sticking of electric actuator 198, a failure that makes a drive current for electric actuator 198 excessive, and a failure in a motor resolver of electric actuator 198. Specific examples of such a failure that makes the drive current for electric actuator 198 excessive include a failure that causes an overcurrent condition of the drive current, and a failure that brings the drive current not less than an allowable current (hereinafter referred to as heat-resistance allowable current) set in view of heat-resisting properties.

Figure 2:
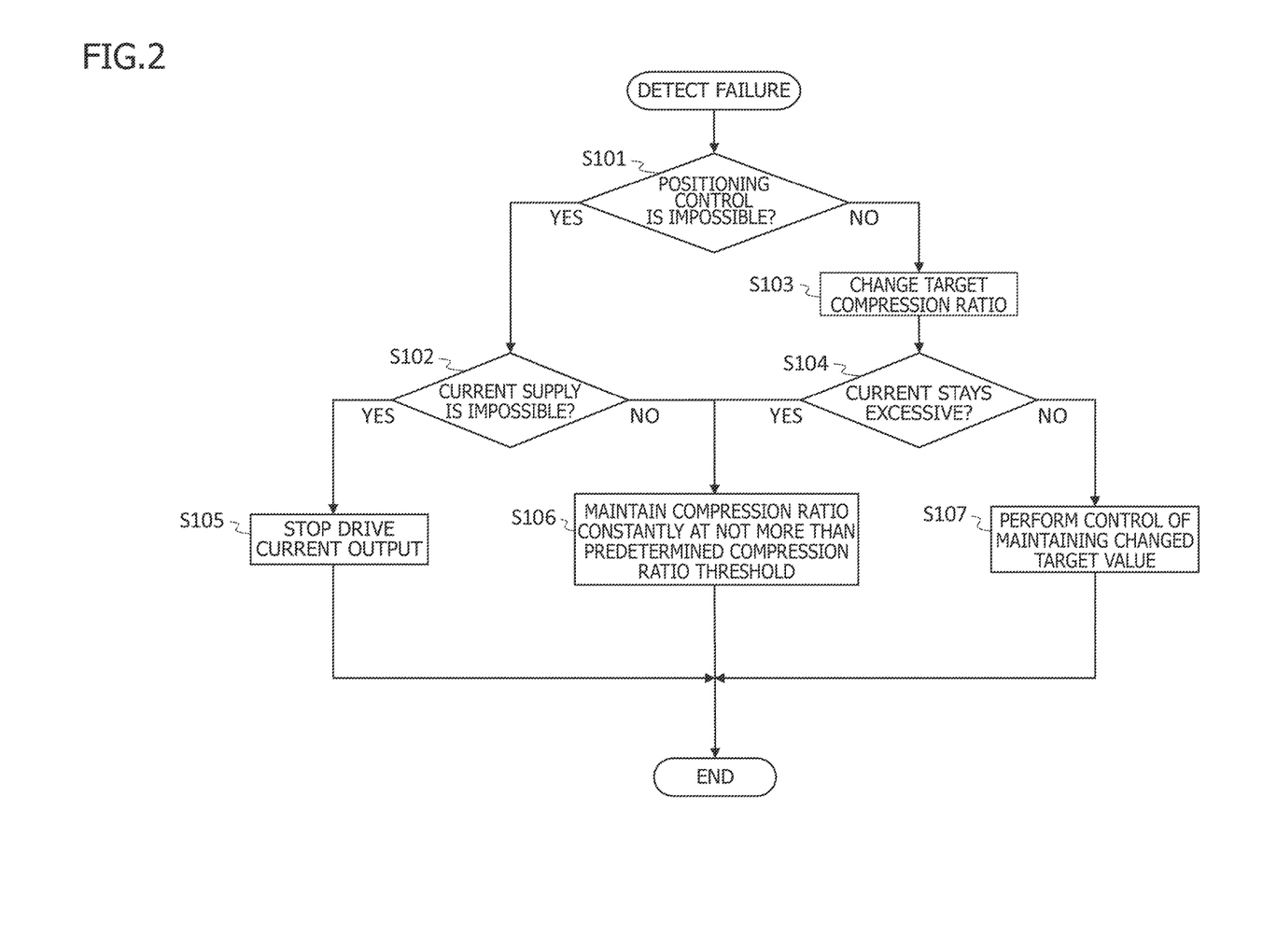
FIG. 2 is a flowchart for illustrating an embodiment of fail-safe control.

Hereinafter, with reference to the flowchart of FIG. 2, a description will be given of processing in which VCR controller 214 detects a failure of VCR mechanism 190 in internal combustion engine 100, and performs fail-safe control. FIG. 2 represents a processing flow through which VCR controller 214 controls VCR mechanism 190 so as to change the compression ratio upon occurrence of a failure of VCR mechanism 190 in internal combustion engine 100. Note that processor P performs the processing.

In step 101, upon detection of a failure, such as sticking of electric actuator 198, in VCR mechanism 190, VCR controller 214 determines whether or not it is possible to perform control (hereinafter referred to as positioning control) of the angular position of control shaft 196 in VCR mechanism 190. When an angle detected by angle sensor 198A is changed by changing the drive current for electric actuator 198, VCR controller 214 can determine that the positioning control is possible. When the angle is not changed by changing the drive current, VCR controller 214 can determine that the positioning control is impossible. When VCR controller 214 determines that the positioning control is impossible, the operation proceeds to step 102. When VCR controller 214 determines that the positioning control is possible, the operation proceeds to step 103.

Note that detectable failures may be previously categorized into two groups, that is, a positioning-control possible group and a positioning-control impossible group, and registered in VCR controller 214. Thereby, when the detected failure belongs to the positioning-control possible group, VCR controller 214 may determine that the positioning control is possible. When the detected failure belongs to the positioning-control impossible group, VCR controller 214 may determine that the positioning control is impossible.

After detecting any failure in step 101, VCR controller 214 controls the compression ratio on the basis not of the target compression ratio transmitted by ECM 216, but of the compression ratio set by VCR controller 214.

When determining the positioning control is impossible, VCR controller 214 then determines whether or not a current can be supplied to electric actuator 198 in step 102. For example, when the drive current for electric actuator 198 is larger than a predetermined value (rated current value, for example), VCR controller 214 can determine that the current supply is impossible. When this drive current is smaller than the predetermined value, VCR controller 214 can determine that the current supply to electric actuator 198 is possible. When VCR controller 214 determines that the current supply is impossible, the operation proceeds to step 105. When VCR controller 214 determines that the current supply to electric actuator 198 is possible, the operation proceeds to step 106.

Note that detectable failures may be categorized into two groups, that is, a current-supply possible group and a current-supply impossible group, and registered in VCR controller 214. Thereby, when the detected failure belongs to the current-supply possible group, VCR controller 214 may determine that the current supply to electric actuator 198 is possible. When the detected failure belongs to the current-supply impossible group, VCR controller 214 may determine that the current supply to electric actuator 198 is impossible.

In step 105, VCR controller 214 performs control of stopping the output of the drive current for electric actuator 198. In addition to performing this control, VCR controller 214 may transmit, to ECM 216, the actual compression ratio detected by angle sensor 198A. Upon receipt of the actual compression ratio, ECM 216 may control ignition timing based on the actual compression ratio in a retard direction so as to suppress occurrence of heavy knocking or in an advance direction so as to suppress combustion deterioration. In addition, on the basis of the actual compression ratio, ECM 216 may calculate the target phase angle to which the center phase of the operation angle is advanced or retarded so as to maintain the effective compression ratio at the time of failure detection, or to increase or reduce the effective compression ratio as compared to that at the time of failure detection. Then, ECM 216 transmits the target phase angle to VTC controller 212. In response, VTC controller 212 controls VTC mechanism 180 on the basis of the target phase angle.

This is the end of the processing for the fail-safe control performed upon occurrence of a failure that makes the positioning control and the current supply impossible.

In step 106, VCR controller 214 performs control of maintaining the compression ratio at not more than the predetermined compression ratio (compression ratio threshold).

For example, when the actual compression ratio detected by angle sensor 198A is more than the compression ratio threshold, VCR controller 214 stops the current supply to electric actuator 198. When the actual compression ratio is reduced to the predetermined compression ratio, VCR controller 214 performs control of maintaining the compression ratio at the predetermined compression ratio by supplying electric actuator 198 with the drive current according to the actual compression ratio.

On the other hand, when the actual compression ratio is not more than the compression ratio threshold, VCR controller 214 performs control of maintaining the compression ratio at that actual compression ratio. Here, the compression ratio threshold may be set to the compression ratio that does not cause knocking, for example. When, for example, the actual compression ratio is not more than approximately a minimum compression ratio of VCR mechanism 190, VCR controller 214 may set the compression ratio to the minimum compression ratio by keeping stopping the output of the drive current. In step 106, VCR controller 214 may stop the current supply to electric actuator 198 at the time of failure detection while setting the predetermined compression ratio to a value obtained by reducing the actual compression ratio detected at the time of failure detection by a predetermined value (not more than the maximum change corresponding to a maximum allowable torque variation), for example. When the actual compression ratio is reduced to the predetermined compression ratio after stopping the current supply to electric actuator 198, VCR controller 214 may perform control of maintaining the compression ratio by supplying electric actuator 198 with the drive current according to the actual compression ratio.

The control in step 106 as described above can suppress fluctuation in the compression ratio, and can prevent control shaft 196 from interfering with a stopper mechanism (not illustrated) for regulating the rotational position of control shaft 196, thereby preventing control shaft 196 and the stopper mechanism from being damaged by such an interference.

In the control in step 106, VCR controller 214 may transmit the actual compression ratio to ECM 216. In response, ECM 216 may control ignition timing based on the actual compression ratio in a similar way to step 105. In addition, ECM 216 may calculate the target phase angle on the basis of the actual compression ratio, and transmit the target phase angle to VTC controller 212. In response, VTC controller 212 controls VTC mechanism 180 on the basis of the target phase angle.

This is the end of the processing for the fail-safe control performed upon occurrence of a failure that makes the positioning control impossible but allows the current supply to electric actuator 198.

When determining that the positioning control is possible in step 101, VCR controller 214 changes the target compression ratio to a lower compression ratio than that at the time of failure detection, in step 103. For example, VCR controller 214 may set the target compression ratio to a value obtained by reducing, by a predetermined value, the target compression ratio at the time of failure detection. Moreover, VCR controller 214 may limit the speed of changing the compression ratio so as to minimize impact on the performance of internal combustion engine 100.

In step 104, VCR controller 214 determines whether the condition in which the drive current for electric actuator 198 is not less than the predetermined current (heat-resistance allowable current, for example) continues for not less than a first predetermined time.

When determining that the condition continues for not less than the first predetermined time, the operation proceeds to step 106, in which VCR controller 214 maintains the compression ratio at the predetermined compression ratio.

This is the end of the processing for the fail-safe control performed upon occurrence of a failure that allows the positioning control, and causes the condition in which the drive current for electric actuator 198 is not less than the predetermined current to continue for not less than the predetermined time after the compression ratio is changed.

When determining that the condition in which the drive current for electric actuator 198 is not less than the predetermined current does not continue for the first predetermined time or more, the operation proceeds to step 107, in which VCR controller 214 performs control of maintaining the compression ratio at the target compression ratio. In addition to performing this control, VCR controller 214 may transmit an actual compression ratio to ECM 216. In response, ECM 216 may control ignition timing based on the actual compression ratio. Moreover, in a similar way to step 105, ECM 216 may calculate the target phase angle based on the actual compression ratio, and transmit the target phase angle to VTC controller 212. In response, VTC controller 212 controls VTC mechanism 180 on the basis of the target phase angle.

This is the end of the processing for the fail-safe control performed upon occurrence of a failure that allows the positioning control and does not cause the condition in which the drive current for electric actuator 198 is not less than the predetermined current to continue for the predetermined time or more.

As described above, upon occurrence of a failure of VCR mechanism 190, VCR controller 214 performs control of reducing the compression ratio or maintaining the compression ratio at the time of the failure occurrence. In other words, VCR controller 214 prohibits the control of changing the compression ratio to a higher compression ratio when any failure occurs in VCR mechanism 190.

Hereinafter, a detailed description will be given of specific examples of processing according to the flowchart of FIG. 2 through which VCR controller 214 detects a failure and performs fail-safe control.

Specific Example 1

The following description will be given of failure detection and fail-safe control performed upon occurrence of a failure that makes both the positioning control and the current supply impossible, in particular, upon occurrence of sticking of electric actuator 198 or a failure that causes an overcurrent condition of the drive current for electric actuator 198.

First, VCR controller 214 detects sticking of electric actuator 198 or a failure that causes an overcurrent condition of the drive current for electric actuator 198.

Specifically, VCR controller 214 determines the detection of a failure when detecting that the angle detected by angle sensor 198A is substantially unchanged even after VCR controller 214 controls the drive current for electric actuator 198 so as to change the compression ratio, that is, change the angular position of control shaft 196 on the basis of the target angle received from ECM 216. In addition, VCR controller 214 determines the detection of a failure when detecting that the condition in which the drive current for electric actuator 198 is above a predetermined overcurrent determination threshold (a value slightly less than the rated current value, for example) continues for a predetermined time. For example, VCR controller 214 can measure, by using the timer, duration of the condition in which the drive current for electric actuator 198 is not less than the overcurrent determination threshold, and determine the detection of a failure when the duration of the condition reaches the predetermined time. Thus, VCR controller 214 detects occurrence of a failure in VCR mechanism 190 on the basis of the drive current for electric actuator 198.

Since the detected failure is sticking of electric actuator 198 or a failure that causes an overcurrent condition of the drive current for electric actuator 198, VCR controller 214 then determines that the positioning control is impossible. In addition, VCR controller 214 determines that the current supply to electric actuator 198 is impossible under this failure condition. Then, VCR controller 214 prohibits the control of changing the compression ratio to a higher compression ratio, and stops the output of the drive current for electric actuator 198.

In addition to performing the fail-safe control, VCR controller 214 may transmit, to ECM 216, the actual compression ratio detected by angle sensor 198A.

Upon receipt of the actual compression ratio, ECM 216 may control ignition timing based on the actual compression ratio in the retard direction so as to suppress occurrence of heavy knocking due to an increase in the actual effective compression ratio. In addition, on the basis of the actual compression ratio, ECM 216 may calculate the target phase angle to which the center phase of the operation angle is retarded so as to maintain the effective compression ratio at the time of failure detection, or to change the effective compression ratio to a value that can suppress occurrence of heavy knocking. Then, ECM 216 transmits the target phase angle to VTC controller 212. Upon receipt of the target phase angle, VTC controller 212 controls VTC mechanism 180 on the basis of the target phase angle.

Alternatively, upon receipt of the actual compression ratio, ECM 216 may control ignition timing based on the actual compression ratio in the advance direction so as to suppress combustion deterioration due to a reduction in the actual effective compression ratio. In addition, on the basis of the actual compression ratio, ECM 216 may calculate the target phase angle to which the center phase of the operation angle is advanced so as to maintain the effective compression ratio at the time of failure detection, or to suppress a reduction in the effective compression ratio from the time of the failure detection. Then, ECM 216 transmits the target phase angle to VTC controller 212. Upon receipt of the target phase angle, VTC controller 212 controls VTC mechanism 180 on the basis of the target phase angle.

The control as described above can prevent another failure due to an overcurrent or the like from occurring in electric actuator 198 by stopping the drive current for electric actuator 198 on the basis of the determination that the current supply thereto is impossible. Moreover, even when the failure makes the positioning control impossible, the control can reduce the impact of the failure by controlling the ignition timing and VTC mechanism 180 on the basis of the actual compression ratio.

Specific Example 2

The following description will be given of failure detection and fail-safe control performed upon occurrence of a failure that makes the positioning control impossible but allows the current supply to electric actuator 198, in particular, upon occurrence of a failure in the motor resolver of electric actuator 198.

First, VCR controller 214 detects a failure in the motor resolver of electric actuator 198. The failure detection may be implemented using any of various well-known methods for detecting a failure of the resolver.

Since the detected failure is a failure in the motor resolver, VCR controller 214 then determines that the positioning control is impossible. In addition, VCR controller 214 then determines that the current supply to electric actuator 198 is possible under this failure condition.

Then, VCR controller 214 prohibits the controlling the compression ratio to a higher compression ratio. Then, VCR controller 214 detects the actual compression ratio by using angle sensor 198A, and determines whether or not the actual compression ratio is not more than the predetermined compression ratio threshold.

When determining that the detected actual compression ratio is not more than the predetermined compression ratio threshold, VCR controller 214 maintains this compression ratio by setting the drive current for electric actuator 198 to a value according to the actual compression ratio.

When determining that the detected actual compression ratio is more than the compression ratio threshold, VCR controller 214 stops the output of the drive current for electric actuator 198. As described above, this stops the operation of electric actuator 198, and thus changes the compression ratio to a lower compression ratio. When the actual compression ratio becomes equal to the predetermined compression ratio, VCR controller 214 maintains this compression ratio by supplying electric actuator 198 with the drive current according to the actual compression ratio.

In addition to performing this control, VCR controller 214 may transmit the actual compression ratio to ECM 216. Upon receipt of the actual compression ratio, ECM 216 may control ignition timing based on the actual compression ratio in the advance direction so as to suppress combustion deterioration due to a reduction in the actual effective compression ratio. In addition, on the basis of the actual compression ratio, ECM 216 may calculate the target phase angle to which the center phase of the operation angle is advanced so as to maintain the effective compression ratio at the time of failure detection, or to suppress a reduction in the effective compression ratio from the time of the failure detection. Then, ECM 216 transmits the target phase angle to VTC controller 212. Upon receipt of the target phase angle, VTC controller 212 controls VTC mechanism 180 on the basis of the target phase angle.

Hereinafter, effects of the fail-safe control in Specific Example 2 will be described with reference to FIG. 3, which displays exemplary changes in the compression ratio and in the drive current for electric actuator 198.

Figure 3:
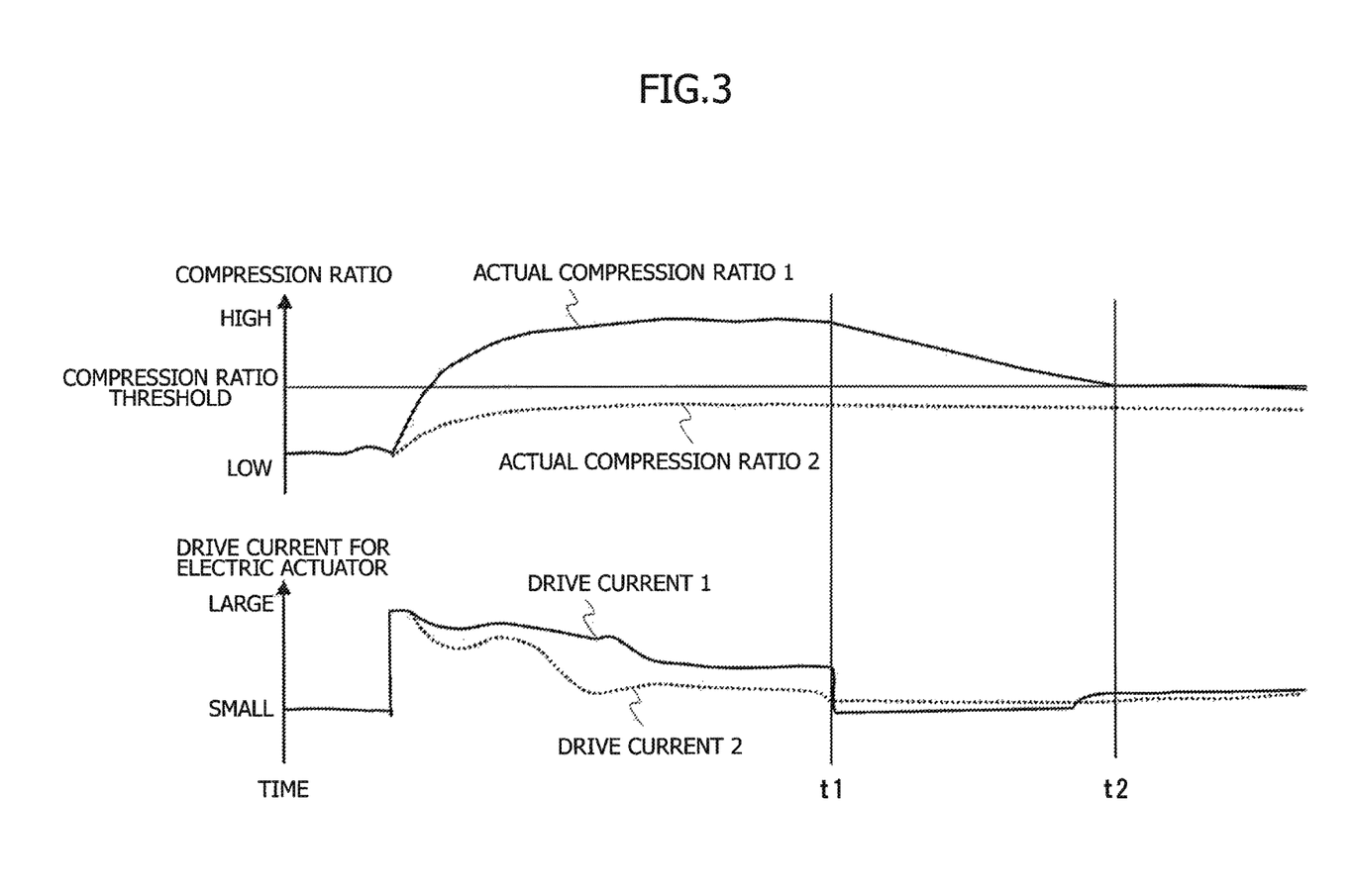
FIG. 3 displays exemplary changes in a compression ratio and in a drive current for an electric actuator in a specific example in which a failure occurs in the variable compression ratio mechanism in the embodiment illustrated in FIG. 1.

In FIG. 3, actual compression ratio 1 indicates an exemplary change in the compression ratio, and drive current 1 indicates an exemplary change in the electric current value under the condition in which the compression ratio at occurrence of a failure is more than the predetermined compression ratio. Meanwhile, actual compression ratio 2 indicates an exemplary change in the compression ratio, and drive current 2 indicates an exemplary change in the electric current value under the condition in which the compression ratio at occurrence of a failure is not more than the predetermined compression ratio.

First, at time point t1, VCR controller 214 determines that the present failure makes the positioning control impossible but allows the current supply to electric actuator 198, and thus detects the actual compression ratio by using angle sensor 198A. When the actual compression ratio is not more than the compression ratio threshold as indicated by actual compression ratio 2, VCR controller 214 performs control of maintaining this compression ratio. On the other hand, when the actual compression ratio is more than the compression ratio threshold as indicated by actual compression ratio 1, VCR controller 214 stops the output of the drive current for electric actuator 198. Thereby, the drive current for electric actuator 198 is reduced as indicated by drive current 1 of FIG. 3, and the actual compression ratio is changed to a lower compression ratio as indicated by actual compression ratio 1 by the operation of internal combustion engine 100. Then, as indicated by actual compression ratio 1, VCR controller 214 performs control of maintaining the compression ratio at time point t2 when the actual compression ratio becomes not more than the compression ratio threshold.

As described above, the capability of determining that, though the positioning control is impossible, the current supply to electric actuator 198 is still possible makes it possible to maintain the compression ratio by controlling the drive current at a value according to the actual compression ratio even though the compression ratio cannot be changed through rotation control using the motor resolver. Moreover, controlling the actual compression ratio at not more than the compression ratio threshold makes it possible to suppress occurrence of heavy knocking caused when the compression ratio is kept at a higher compression ratio.

Moreover, along with this control, the ignition timing and VTC mechanism 180 is controlled on the basis of the actual compression ratio, as described above. This makes it possible to suppress combustion deterioration in accordance with the maintained compression ratio.

Specific Example 3

The following description will be given of failure detection and fail-safe control performed upon occurrence of a failure that allows the positioning control, in particular, a failure that causes the condition in which the drive current for electric actuator 198 is not less than the heat-resistance allowable current.

VCR controller 214 determines the detection of failure occurrence when detecting that the condition in which the drive current for electric actuator 198 is not less than its heat-resistance allowable current threshold continues for the predetermined time (time for determining whether beyond heat-resistance allowance). For example, VCR controller 214 can measure, by using the timer, duration of the condition in which the drive current for electric actuator 198 is not less than the heat-resistance allowable current threshold, and detect a failure when the duration of the condition reaches the predetermined time. Thus, VCR controller 214 detects occurrence of a failure in VCR mechanism 190 on the basis of the drive current for electric actuator 198.

Since the detected failure is a failure that makes the drive current for electric actuator 198 not less than the heat-resistance allowable current, VCR controller 214 then determines that the positioning control is possible.

VCR controller 214 prohibits the control of changing the compression ratio to a higher compression ratio, and changes the target compression ratio to a lower compression ratio than that at the time of failure detection.

VCR controller 214 determines whether the condition in which the drive current for electric actuator 198 is not less than the heat-resistance allowable current threshold further continues for not less than the first predetermined time (time for post-control determination) after the control of changing the compression ratio to a higher compression ratio is prohibited.

When determining that the condition in which the drive current for electric actuator 198 is not less than the heat-resistance allowable current threshold does not continue for the first predetermined time (time for post-control determination) or more, VCR controller 214 continues to perform the controlling or maintaining the compression ratio to the target compression ratio.

Thereafter, when determining that a second predetermined time, which is longer than the first predetermined time, elapses after the control of changing the compression ratio to a higher compression ratio is prohibited, VCR controller 214 returns to normal control in which VCR mechanism 190 is controlled in accordance with operating conditions of internal combustion engine 100. At that time, VCR controller 214 may transmit, to ECM 216, a command to cause ECM 216 to return to the normal control. In response to the command, ECM 216 returns to the normal control. ECM 216 controls ignition timing on the basis of operating conditions of internal combustion engine 100. In addition, ECM 216 calculates the target phase angle of VTC mechanism 180 on the basis of the operating conditions of internal combustion engine 100, and transmits the target phase angle to VTC controller 212.

Here, the second predetermined time may be preset to a time long enough to reduce the temperature of the motor of electric actuator 198, for example. Alternatively, the second predetermined time may be set to a time that ECM 216 calculates or selects on the basis of the load condition (the value of the drive current for electric actuator 198 at the time of failure detection, for example) of electric actuator 198.

Instead of returning to the normal control, VCR controller 214 may perform dedicated control for return. In the dedicated control for return, VCR controller 214 imposes a stricter limit on the drive current for electric actuator 198 than during normal control by narrowing the range of change of the compression ratio, in other words, the range of motion of control shaft 196, as compared to those during the normal control.

On the other hand, when determining that the condition in which the drive current for electric actuator 198 is not less than the heat-resistance allowable current continues for not less than the first predetermined time, VCR controller 214 stops the output of the drive current for electric actuator 198.

When the output of the drive current for electric actuator 198 stops, the compression ratio changes to a lower compression ratio as described above. When the actual compression ratio detected by angle sensor 198A becomes equal to the predetermined compression ratio threshold, VCR controller 214 performs control of maintaining the compression ratio by supplying electric actuator 198 with the drive current according to the actual compression ratio. Thereafter, when the condition in which the drive current for electric actuator 198 is not less than the heat-resistance allowable current continues for not less than a predetermined time (having a length equal to or different from that of the first predetermined time) after the control of maintaining the compression ratio is performed, VCR controller 214 can perform again the control of stopping the output of the drive current for electric actuator 198.

When the actual compression ratio, which is more than the compression ratio threshold at the time of stopping the output of the drive current for electric actuator 198, is not reduced to not more than the compression ratio threshold even after the drive current stops, VCR controller 214 can maintain the stopped state of the drive current. In addition, when the actual compression ratio is not more than the predetermined compression ratio threshold at the time of stopping the output of the drive current for electric actuator 198, VCR controller 214 can maintain the stopped state of the drive current.

Here, multiple compression ratio thresholds can be set in VCR controller 214. This allows VCR controller 214 to perform control of maintaining the compression ratio by supplying electric actuator 198 with the drive current according to the actual compression ratio when, after the drive current for electric actuator 198 is stopped, the actual compression ratio reaches one of the compression ratio thresholds that is less than the actual compression ratio at the time of stopping the drive current for electric actuator 198, and that is closest to that actual compression ratio. Here, assume the case where VCR controller 214 stops the output of the drive current for electric actuator 198 upon detecting that the condition in which the drive current for electric actuator 198 is not less than the heat-resistance allowable current continues for not less than the predetermined time after VCR controller 214 performs the control of maintaining the compression ratio at the first compression ratio threshold. In this case, for example, the multiple threshold configuration allows VCR controller 214 to perform control of maintaining the compression ratio when the actual compression ratio is reduced to the second compression ratio threshold, which is less than the first compression ratio threshold. Note that even when multiple compression ratio thresholds are set in VCR controller 214, VCR controller 214 does not restart the output of the drive current for electric actuator 198 until the compression ratio reaches a predetermined compression ratio threshold.

When the actual compression ratio at the time of stopping the drive current for electric actuator 198 is not more than a set value approximately equal to the minimum compression ratio of VCR mechanism 190, VCR controller 214 may maintain the stopped state of the drive current output.

In addition to performing the control as described above, VCR controller 214 may transmit the actual compression ratio to ECM 216. Upon receipt of the actual compression ratio, ECM 216 may control ignition timing based on the actual compression ratio in the advance direction so as to suppress combustion deterioration due to a reduction in the actual effective compression ratio. In addition, on the basis of the actual compression ratio, ECM 216 may calculate the target phase angle to which the center phase of the operation angle is advanced so as to maintain the effective compression ratio at the time of failure detection, or to suppress a reduction in the effective compression ratio from the time of the failure detection. Then, ECM 216 transmits the target phase angle to VTC controller 212. Upon receipt of the target phase angle, VTC controller 212 controls VTC mechanism 180 on the basis of the target phase angle.

Hereinafter, effects of the control in Specific Example 3 will be described with reference to FIGS. 4 and 5, which display exemplary changes in the compression ratio and in the drive current for electric actuator 198.

Figure 4:
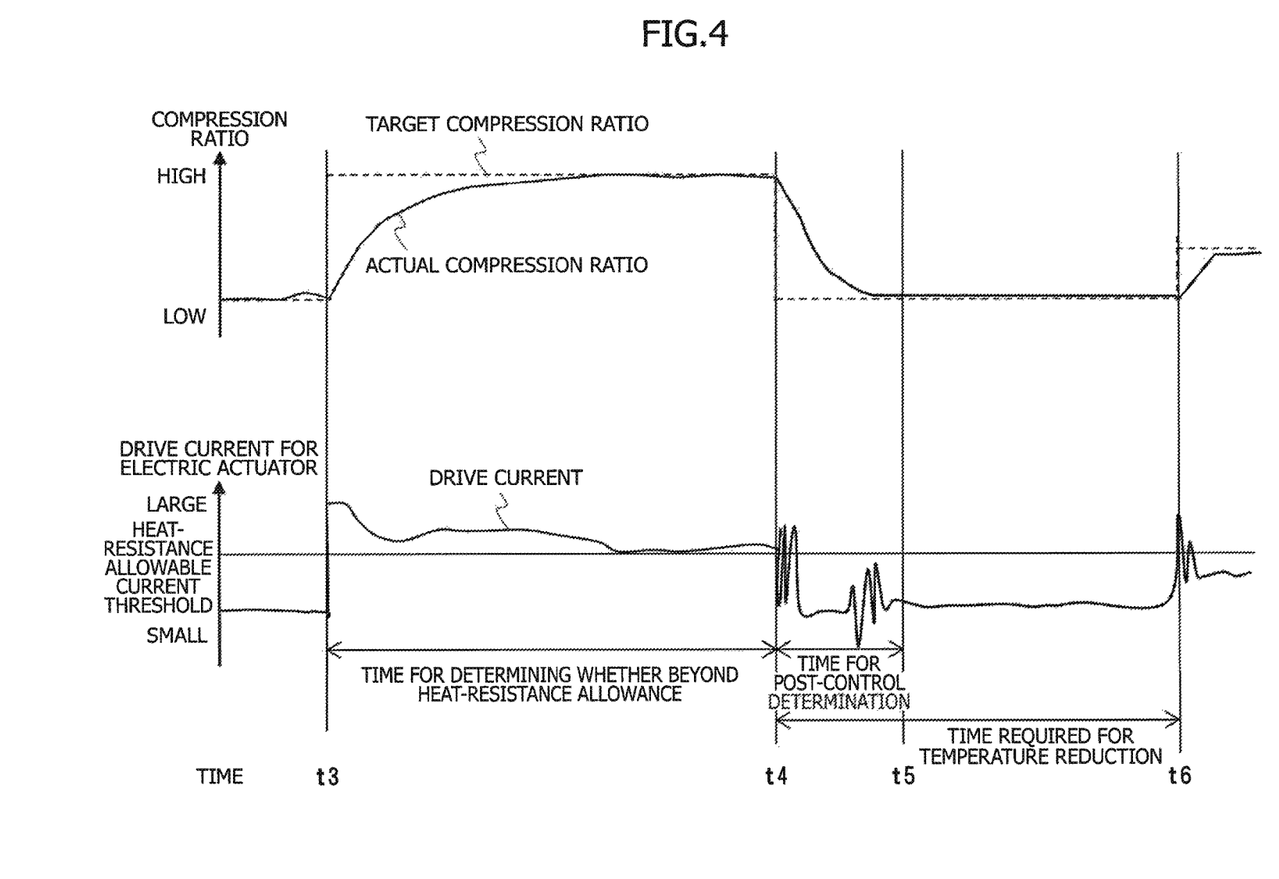
FIG. 4 displays exemplary changes in the compression ratio and in the drive current for the electric actuator in another specific example different from that in FIG. 3.

FIG. 4 displays exemplary changes in the compression ratio and in the drive current for electric actuator 198 when the drive current does not stay above the heat-resistance allowable current threshold after the target compression ratio is changed.

First, at time point t3, VCR controller 214 detects that the drive current for electric actuator 198 exceeds the heat-resistance allowable current threshold. Then, VCR controller 214 activates the timer. After the time for determining whether beyond heat-resistance allowance elapses from time point t3 in a situation where the drive current for electric actuator 198 does not fall below the heat-resistance allowable current threshold (that is, at time point t4 when the predetermined time elapses from time point t3), VCR controller 214 detects occurrence of a failure.

Upon detecting the failure, VCR controller 214 determines that the positioning control is possible. Then, VCR controller 214 prohibits the control of changing the compression ratio to a higher compression ratio, and controls the compression ratio to a lower compression ratio by changing the target compression ratio to a lower compression ratio than that at the time of failure detection. This control reduces the compression ratio to the target compression ratio, reducing the drive current accordingly, as displayed in FIG. 4.

After that, when, as displayed in FIG. 4, the drive current is sufficiently reduced before time point t5 when the first predetermined time elapses from time point t4, in other words, when the drive current falls below the heat-resistance allowable current threshold before the first predetermined time elapses after the control of changing the compression ratio to a higher compression ratio is prohibited, VCR controller 214 performs the control of changing or maintaining the compression ratio to the target compression ratio. Then, at time point t6, when the second predetermined time (time required for temperature reduction), which is long enough to reduce the temperature of the motor of electric actuator 198, elapses after the control of changing the compression ratio to a higher compression ratio is prohibited, VCR controller 214 performs the normal control on the compression ratio.

Figure 5:
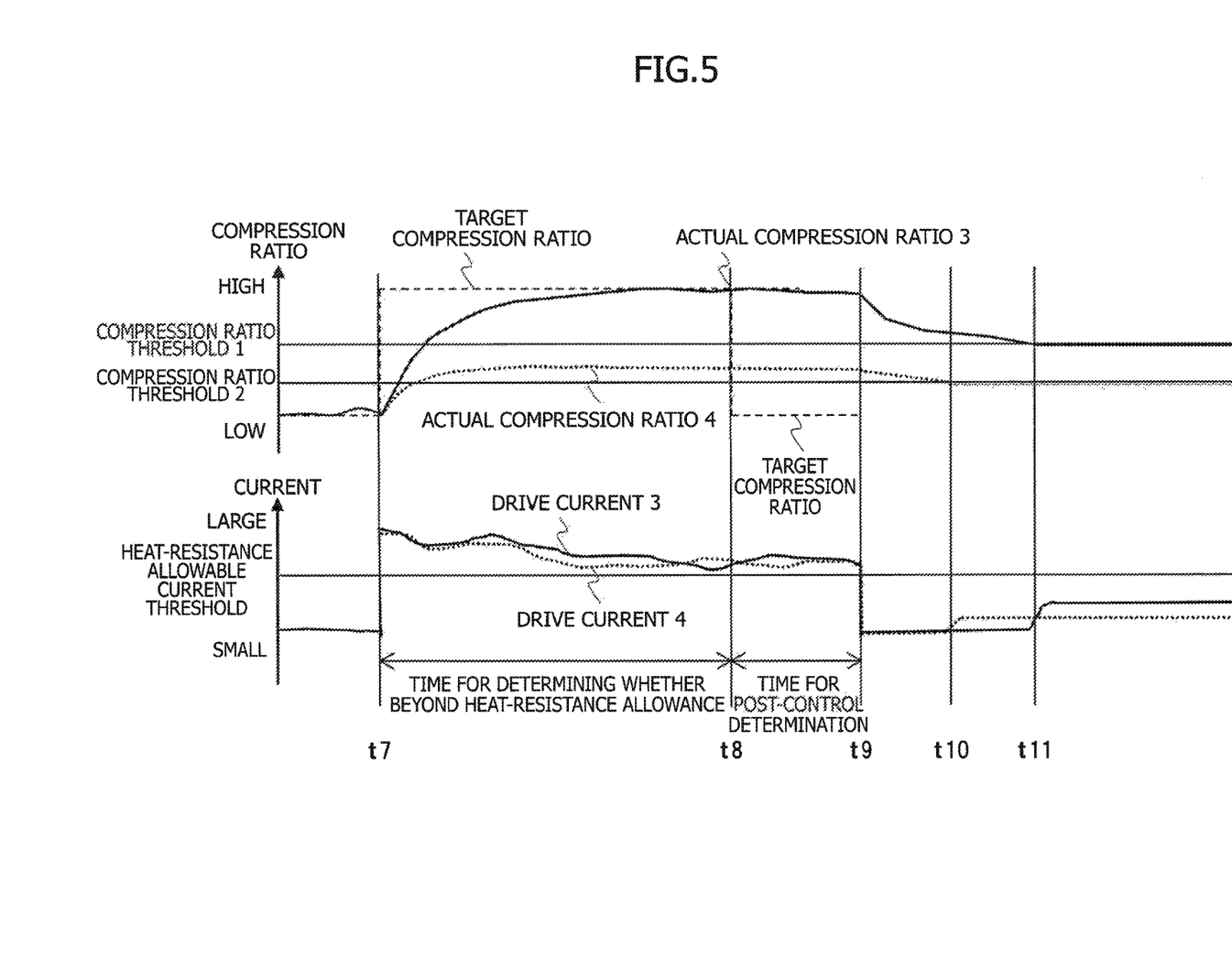
FIG. 5 displays exemplary changes in the compression ratio and in the drive current for the electric actuator in still another specific example.

FIG. 5 displays exemplary changes in the compression ratio and in the drive current for electric actuator 198 when the multiple compression ratio thresholds are set in VCR controller 214, and when the drive current stays above the heat-resistance allowable current threshold after the target compression ratio is changed.

In FIG. 5, compression ratio threshold 1 is more than compression ratio threshold 2, and actual compression ratios 3 and 4 correspond to drive currents 3 and 4, respectively.

First, at time point t7, VCR controller 214 detects that the drive current for electric actuator 198 exceeds the heat-resistance allowable current threshold. Then, VCR controller 214 activates the timer. At time point t8 when the time for determining whether beyond heat-resistance allowance elapses from time point t7 in a situation where the drive current for electric actuator 198 does not fall below the heat-resistance allowable current threshold, VCR controller 214 detects occurrence of a failure.

Upon detecting the failure, VCR controller 214 determines that the positioning control is possible. Then, VCR controller 214 prohibits the control of changing the compression ratio to a higher compression ratio, and performs control of changing the compression ratio to a lower compression ratio by changing the target compression ratio to a lower compression ratio than that at the time of failure detection. Though this control is performed with the aim of reducing the compression ratio so as to reduce the drive current for electric actuator 198, the drive current might not be reduced as indicated by drive currents 3 and 4 of FIG. 5 depending on what failure occurs.

Assume here that the drive current for electric actuator 198 does not fall below the heat-resistance allowable current threshold after time point t8, so that, at time point t9 when the first predetermined time elapses from time point t8, the condition in which the drive current for electric actuator 198 is not less than the heat-resistance allowable current threshold continues for not less than the first predetermined time after the control of changing the compression ratio to a higher compression ratio is prohibited. In this case, VCR controller 214 performs control of stopping the output of the drive current for electric actuator 198 at time point t9.

When the actual compression ratio is more than compression ratio threshold 1 as indicated by actual compression ratio 3, VCR controller 214 performs control of maintaining the compression ratio at time point t11 when the actual compression ratio is reduced to compression ratio threshold 1. On the other hand, when the actual compression ratio is less than compression ratio threshold 1 but more than compression ratio threshold 2 as indicated by actual compression ratio 4, VCR controller 214 performs control of maintaining the compression ratio at time point t10 when the actual compression ratio is reduced to compression ratio threshold 2, which is less than the actual compression ratio at the time of stopping the drive current for electric actuator 198, and that is closest to that actual compression ratio.

The control as described above makes it possible to adjust the drive current for electric actuator 198 so as to prevent another failure from occurring therein, and thus allows for protecting electric actuator 198. Moreover, the above control can prevent abrupt changes in torque by controlling the compression ratio to the extent possible.

In this embodiment, the three controllers, that is, ECM 216, VTC controller 212, and VCR controller 214, respectively control the ignition timing, VTC mechanism 180 and VCR mechanism 190 of internal combustion engine 100. However, alternatively, one or two controllers may control a VCR mechanism, a VTC mechanism and ignition timing in an internal combustion engine.

When VCR controller 214 restarts the operation of internal combustion engine 100 after stopping the operation of internal combustion engine 100 while performing the compression-ratio maintaining control in response to occurrence of a failure, VCR controller 214 starts the compression-ratio maintaining control for maintaining the compression ratio at the time of stopping the operation.

REFERENCE SYMBOL LIST

100 Internal combustion engine
190 VCR mechanism
198 Electric actuator
214 VCR controller
216 ECM

The invention claimed is:

1. A control device for an internal combustion engine, comprising:
a VCR controller that is configured to communicate with the internal combustion engine, the internal combustion engine having an electric actuator that is configured to change a compression ratio of the internal combustion engine, wherein
the VCR controller is also configured to: i) when a failure occurs in a variable compression ratio mechanism, prohibit changing the compression ratio to a higher compression ratio, and ii) stop current supply to the electric actuator when a drive current for the electric actuator is not less than a predetermined value after changing the compression ratio to the higher compression ratio is prohibited,
the VCR controller is also configured to stop the current supply to the electric actuator when the drive current for the electric actuator is not less than the predetermined value for a first predetermined time after changing the compression ratio to the higher compression ratio is prohibited, and
the VCR controller is also configured to control the compression ratio in accordance with an operating condition of the internal combustion engine when, after the drive current for the electric actuator falls below the predetermined value before the first predetermined time elapses after changing the compression ratio to the higher compression ratio is prohibited, a second predetermined time, which is longer than the first predetermined time, elapses after changing the compression ratio to the higher compression ratio is prohibited.

2. The control device according to claim 1, wherein, at the time of prohibiting changing the compression ratio to the higher compression ratio,
when the compression ratio is more than a predetermined compression ratio, the VCR controller is configured to stop the current supply to the electric actuator, and then the VCR controller is configured to restart the current supply to the electric actuator at a timing when the compression ratio reaches the predetermined compression ratio, and
when the compression ratio is not more than the predetermined compression ratio, the VCR controller is configured to maintain the compression ratio as it is.

3. The control device according to claim 1, wherein the VCR controller is configured to detect the failure on the basis of the drive current for the electric actuator.

4. The control device according to claim 1, wherein
the internal combustion engine further includes a variable valve timing mechanism for making valve timing variable, and
when the failure occurs in the variable compression ratio mechanism, the VCR controller is configured to control the variable valve timing mechanism on the basis of the compression ratio.

5. The control device according to claim 1, wherein
the internal combustion engine further includes a spark plug which allows ignition timing to be changed, and
when the failure occurs in the variable compression ratio mechanism, the VCR controller is configured change the ignition timing on the basis of the compression ratio.

6. A control method for an internal combustion engine, the method comprising:

determining that a drive current for an electric actuator is not less than a predetermined value for a first predetermined time after changing a compression ratio to a higher compression ratio is prohibited;
controlling a variable compression ratio mechanism using a VCR controller that is configured to prohibit the electric actuator from changing the compression ratio to the higher compression ratio when a failure occurs in the variable compression ratio mechanism;
determining that the drive current for the electric actuator falls below the compression ratio to the higher compression ratio is prohibited, the second predetermined time being longer than the first predetermined time; and
stopping current supply to the electric actuator, using the VCR controller, when a drive current for the electric actuator is not less than the predetermined value after changing the compression ratio to the higher compression ratio is prohibited, wherein
the step of stopping the current supply to the electric actuator takes place when the drive current for the electric actuator is not less than the predetermined value for the first predetermined time after changing the compression ratio to the higher compression ratio is prohibited, and
in the step of controlling the variable compression ratio mechanism, the VCR controller controls the compression ratio in accordance with an operating condition of the internal combustion engine when, after the drive current for the electric actuator falls below the predetermined value before the first predetermined time elapses after changing the compression ratio to the higher compression ratio is prohibited, the second predetermined time elapses after changing the compression ratio to the higher compression ratio is prohibited.

7. The control method for the internal combustion engine according to claim 6, wherein, at the time of prohibiting changing the compression ratio to the higher compression ratio,
when the compression ratio is more than a predetermined compression ratio, the VCR controller is configured to stop the current supply to the electric actuator, and then the VCR controller is configured to restart the current supply to the electric actuator at a timing when the compression ratio reaches the predetermined compression ratio, and
when the compression ratio is not more than the predetermined compression ratio, the VCR controller is configured to maintain the compression ratio as it is.

8. The control method for the internal combustion engine according to claim 6, wherein the VCR controller is configured to detect the failure on the basis of the drive current for the electric actuator.

9. The control method for the internal combustion engine according to claim 6, wherein, when the failure occurs in the variable compression ratio mechanism, the VCR controller is configured to prohibit changing the compression ratio to the higher compression ratio, and controls a variable valve timing mechanism for making valve timing variable on the basis of the compression ratio.

10. The control method for the internal combustion engine according to claim 6, wherein, when the failure occurs in the variable compression ratio mechanism, the VCR controller is configured to prohibit changing the compression ratio to the higher compression ratio, and changes ignition timing on the basis of the compression ratio by using a spark plug which allows the ignition timing to be changed.

\* \* \* \* \*